Aug. 16, 1938.    R. D. SALMON    2,127,145
PRINTING TELEGRAPH APPARATUS
Filed Dec. 2, 1936
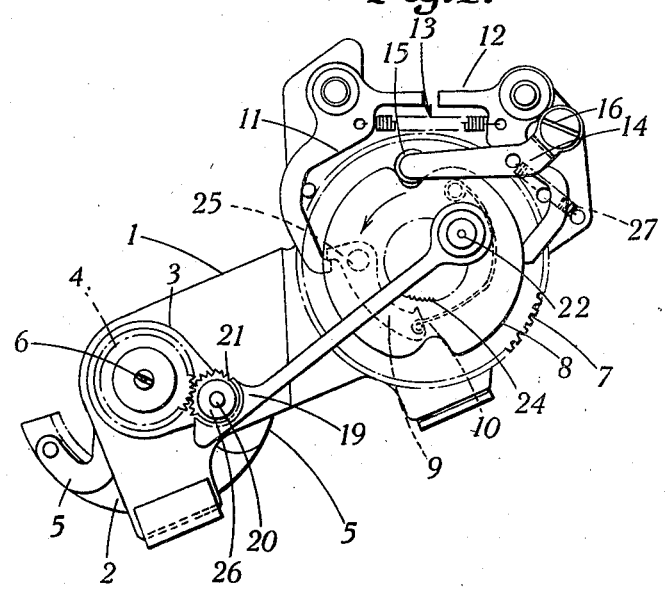
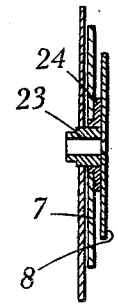
INVENTOR
REGINALD D. SALMON
BY
ATTORNEY Patented Aug. 16, 1938

2,127,145

UNITED STATES PATENT OFFICE 2,127,145

PRINTING TELEGRAPH APPARATUS

Reginald Dennis Salmon, Croydon, England, assignor to Creed and Company Limited, Croydon, Surrey, England Application December 2, 1936, Serial No. 113,756
In Great Britain December 6, 1935

4 Claims. (Cl. 178—34)

This invention relates to translating mechanism for printing telegraph apparatus and the like, and more particularly to such mechanism consisting of a plurality of interconnected sun and planet gear units, the planet wheels of which are moved in accordance with the respective elements of the character to be translated.

In British Patent No. 436,296 such a mechanism has been described in which a planet wheel of each gear unit is actuated by a rotatable member released for half a revolution according to the nature of the respective element of the character to be translated. This rotatable member moved an arm carrying a toothed arc meshing with an arc carrying the planet wheel.

According to the present invention, in translating mechanism of the kind referred to, the axis of each planet wheel is mounted on one end of a connecting rod, the other end of which is attached to a member adapted to be rotated through half a revolution according to the nature of the respective element of the character to be translated.

In this manner the number of linkages in the system is reduced to a minimum, and the movement given to the planet wheel is determined directly and without intermediate magnification by the movement of the rotatable member. Thus the amount of backlash in the mechanism is reduced and any backlash occurring is not magnified in its effect on the final movement.

Preferably, the pivot of each planet wheel is coupled by means of a connecting rod to an eccentrically mounted pin on the rotatable member. The use of an eccentrically mounted pin as distinct from an eccentric formed on the connecting rod reduces the size of the machine and also reduces the friction on the pin.

In order to reduce to a minimum the power required the eccentric pin is mounted on a plate carrying a pawl forming one member of a ratchet clutch.

The invention will be better understood from the following description taken in conjunction with the accompanying drawing in which Fig. 1 shows one unit of a translating mechanism for use in printing telegraph apparatus employing the five unit code, and Fig. 2 shows a detailed section of a part of the apparatus of Fig. 1 illustrating the relative arrangement of certain parts thereof.

Referring to the drawing, rotatably mounted at one end of a shaft 6 journalled in a bush in the framework 1 is a sun wheel 4 and at the other end of the shaft 6 are mounted arms 5 to which are fixed an inwardly toothed segment 2, which constitutes an outer sun wheel. On the same shaft as the sun wheel 4 is a bracket 3 carrying bushing as a pivot 20. A connecting rod 19 carries a bushing 26 journalled on pivot 20 and carrying planet wheel 21 meshing with the sun wheel 4 and also with an outer toothed segment on the next unit (not shown) similar to the toothed segment 2. The planet wheel of the next sun and planet gear unit meshes with the segment 2 and with another inner sun wheel similar to wheel 4, as shown in British Patent No. 436,296.

The other end of rod 19 carries a pin 22 journalled in a bush fixed eccentrically to a disc 8, which is mounted on a shaft 23 journalled in a bush in the framework 1. The latter bush also carries a toothed wheel 7 attached to a ratchet wheel 24. The toothed wheel 7 is in mesh with a constantly driven gear wheel (not shown). A pawl 9 adapted to engage with the ratchet wheel 24 is pivotally carried on a pin 25 on the inner surface of the disc 8. The pawl 9 tends to be pressed into engagement with the wheel 24 by a spring 10, anchored to the disc 8. In the position shown the pawl 9 is held out of engagement with the wheel 24 by a two armed detent lever 11, and the disc 8 is held stationary by the engagement of a roller 15 in a notch in the periphery thereof. The roller 15 is carried on the end of a lever 14 pivoted at 16 and held with the roller 15 in the notch by a spring 27.

When the horizontal arm of the two-armed detent lever 11 is depressed, the end of this lever is removed from engagement with the pawl 9, which thereupon engages the rotating gear wheel 24. The disc 8 is therefore rotated in the direction of the arrow with the gear wheel 24. The disc 8 rotates for half a revolution only, for at the end of this rotation the end of the pawl engages the end of another two armed detent lever 12 and is thereby withdrawn from engagement with the wheel 24. At the same time the disc 8 is arrested by the roller 15 being drawn into a second notch on its periphery.

The two detent levers 11, 12 are drawn towards one another, and into positions to engage the pawl 9, by a spring 13. The rotation of the disc 8 through a half revolution involves a movement of the eccentric pin 22 through a half revolution about the hub of the disc 8 and this movement is transferred to the planet wheel 21 by the rod 19. The sun wheel 4 being held fixed, either directly, or because it is connected through gearing to a fixed wheel, as described in British Patent No. 436,296, the movement of the planet wheel 21 causes rotation of the outer toothed segment meshing therewith, which rotation is transferred, either directly or through intermediate similar gear units to an indicating member.

One or other of the levers 11, 12 is actuated according to the nature of an element of a character to be translated. The apparatus shown is repeated for each element of the character. Thus, in type printing telegraph apparatus using the five-unit code, there are five pairs of levers 11, 12, each co-operating with a disc 8 carrying a pin 22 connected to a rod 19 which is connected to the planet wheel 21 of a sun and planet gear unit.

What is claimed is:

1. Translating mechanism for printer telegraph apparatus for receiving signals composed of two different types of elements, a sun and planet wheel arrangement for each character element received, a connecting rod for each character element, the axis of each planet wheel being mounted on one end of said connecting rod, means rotatable through a half revolution according to the type of signal element received, and means for attaching the other end of said connecting rod to said means.

2. Translating mechanism according to claim 1 in which said first named means comprises a rotatable disc, and said second named means comprises a pin eccentrically mounted on said disc.

3. Translating mechanism according to claim 1, in which said rotatable means comprises a disc, further comprising a continuously driven gear wheel mounted coaxially with said disc, a ratchet wheel carried by said gear wheel, a pawl for cooperating with said ratchet wheel carried by said disc, and means for moving said pawl into and out of engagement with said ratchet wheel, for controlling the rotation of said disc.

4. Translating mcehanism according to claim 1, in which said rotatable means comprises a disc, further comprising a continuously driven gear wheel mounted coaxially with said disc, a ratchet wheel carried by said gear wheel, a pawl for cooperating with said ratchet wheel carried by said disc, a pair of detent levers cooperating with said disc and controlled respectively by the two types of signal elements received, said detent levers being provided with means for holding said pawl out of engagement with said ratchet wheel, and means for removing said holding means from said pawl by operation of said detent lever according to the type of element received.

REGINALD DENNIS SALMON.